(12) United States Patent
Hua et al.

(10) Patent No.: US 11,987,319 B2
(45) Date of Patent: May 21, 2024

(54) CRANK QUICK-CONNECTION STRUCTURE, PEDAL ASSEMBLY, AND BICYCLE

(71) Applicant: ROYALBABY CYCLE BEIJING CO., LTD., Beijing (CN)

(72) Inventors: Aicheng Hua, Beijing (CN); Yixiong Wang, Beijing (CN); Zhiwei Chao, Beijing (CN); Lixin Tong, Beijing (CN)

(73) Assignee: ROYALBABY CYCLE BEIJING CO., LTD., Beijing (CN)

( * ) Notice: Subject to any disclaimer, the term of this patent is extended or adjusted under 35 U.S.C. 154(b) by 0 days.

(21) Appl. No.: 18/100,368

(22) Filed: Jan. 23, 2023

(65) Prior Publication Data
US 2023/0415843 A1 Dec. 28, 2023

(30) Foreign Application Priority Data
Jun. 22, 2022 (CN) .......................... 202221599994.X

(51) Int. Cl.
*B62M 3/08* (2006.01)
(52) U.S. Cl.
CPC ..................................... *B62M 3/08* (2013.01)
(58) Field of Classification Search
CPC ....................................................... B62M 3/08
USPC ....................................................... 74/594.4
See application file for complete search history.

(56) References Cited

U.S. PATENT DOCUMENTS

| | | | | |
|---|---|---|---|---|
| 5,078,026 A | * | 1/1992 | Giffin | B62M 3/083 74/594.6 |
| 6,568,296 B1 | * | 5/2003 | Lin | B62K 15/00 403/381 |
| 8,789,841 B2 | * | 7/2014 | Laipple | B62M 3/08 280/294 |
| 2005/0274220 A1 | * | 12/2005 | Reboullet | B62M 3/086 74/594.4 |

(Continued)

FOREIGN PATENT DOCUMENTS

| | | | | |
|---|---|---|---|---|
| CN | 201519107 A | * | 9/2009 | ............. B62M 3/00 |
| CN | 101712363 A | * | 5/2010 | ............. B62M 3/00 |

(Continued)

OTHER PUBLICATIONS

CN 101712363 A, Guo, May 26, 2010 (Year: 2010).*
CN 201519107 A, Guo, Sep. 2, 2009 (Year: 2009).*

*Primary Examiner* — Vinh Luong
(74) *Attorney, Agent, or Firm* — Burris Law, PLLC

(57) ABSTRACT

A crank quick-connection structure is used for connecting a crank with a main shaft, and includes an adapter and a connecting assembly. The adapter is connected to the main shaft, one end of the crank is provided with a cooperating cavity extending in a thickness direction thereof, and the adapter penetrates the cooperating cavity from one end of the cooperating cavity. The connecting assembly is connected to the adapter, and the connecting assembly has a locking position and a releasing position. In the locking position, the crank cooperates with the connecting assembly so that the cooperating cavity and the adapter are locked and connected; and in the releasing position, the crank is disengaged from the connecting assembly so that the crank can be disengaged from the adapter in an axial direction of the adapter.

13 Claims, 8 Drawing Sheets

(56) References Cited

U.S. PATENT DOCUMENTS

| | | | |
|---|---|---|---|
| 2010/0098484 A1* | 4/2010 | Chen | B62M 3/08 |
| | | | 403/380 |
| 2011/0203408 A1 | 8/2011 | White | |
| 2012/0073402 A1* | 3/2012 | Tseng | G05G 1/483 |
| | | | 74/563 |
| 2019/0031282 A1 | 1/2019 | Hsieh | |

FOREIGN PATENT DOCUMENTS

| | | | | |
|---|---|---|---|---|
| CN | 103057652 A | 4/2013 | | |
| EP | 2174864 A1 | 4/2010 | | |
| EP | 3281857 A1 * | 2/2018 | ............ | B62M 3/08 |
| TW | M314724 U | 7/2007 | | |

\* cited by examiner

CRANK QUICK-CONNECTION STRUCTURE, PEDAL ASSEMBLY, AND BICYCLE

CROSS REFERENCE TO RELATED APPLICATION

This patent application claims the benefit and priority of Chinese Patent Application No. 202221599994.X, filed on Jun. 22, 2022, the disclosure of which is incorporated by reference herein in its entirety as part of the present application.

FIELD

The present disclosure relates to the technical field of bicycles, in particular to a crank quick-connection structure, a pedal assembly, and a bicycle.

BACKGROUND

The bicycle is a commonly used vehicle which has the advantages of energy conservation, environmental protection and convenience of usage, and the pedals of the bicycle are key members for the bicycle to move. The pedals of the bicycle are connected to a main shaft of the bicycle by means of cranks, and the pedals are in threaded connection to the cranks. At present, for high-end bicycles in the prior art, the connection of the cranks on both sides is achieved by pressing locking screws at the outer ends of the cranks against the main shaft, and the structural principle is that: firstly, the crank is inserted into the main shaft in advance, and then, the locking screw is rotated in a correct direction so as to be continuously engaged with internal threads of the main shaft to bring a pressing force by which the crank is fixed together with the main shaft. As a result, both the assembly and disassembly of the crank depend on tools. To ensure the safe and reliable operation of the crank, assembling tools have to be used for fastening and firm assembly of the crank. In a case that there are no tools, the crank cannot be fixed to the main shaft safely and reliably by hand. At the same time, assembly tediousness is caused, strength and skills are required, and its assembling process is not friendly to most of female, elderly and child users. In addition, there are too many appendant parts on the bicycle. A customer will obtain assembling tools and some locking screws after buying a bicycle, and all of these parts are purpose-made. Once they are lost, the key parts, i.e. the cranks, of the bicycle cannot be assembled or disassembled, which brings a certain use cost to the customer. Furthermore, the manufacturing processes of the locking screws and the assembling tools are complicated, and incur costs in the production, processing, transportation and storage in the factory, resulting in increased costs.

SUMMARY

An object of the present disclosure is to provide a crank quick-connection structure, which enables quick assembly and disassembly of a crank and a main shaft, provides convenience for assembly and has high commonality, thereby improving user experience and reducing manufacturing costs.

In order to achieve this object, the present disclosure adopts the following technical solution:

a crank quick-connection structure for connecting a crank and a main shaft, including:

an adapter, connected to the main shaft, wherein one end of the crank is provided with a cooperating cavity extending in a thickness direction thereof, and the adapter penetrates in the cooperating cavity from one end of the cooperating cavity; and a connecting assembly, connected to the adapter; wherein the connecting assembly has a locking position and a releasing position; on the locking position, the crank cooperates with the connecting assembly so that the cooperating cavity and the adapter are locked and connected; and in the releasing position, the crank is disengaged from the connecting assembly so that the crank is disengaged from the adapter in an axial direction of the adapter.

Optionally, the connecting assembly includes limiting members, one of an inner wall of the cooperating cavity and an outer wall of the adapter is provided with the limiting members, other one of the inner wall of the cooperating cavity and the outer wall of the adapter is provided with limiting grooves, the limiting members are movable in a radial direction of the cooperating cavity between the locking position in which the limiting members are at least partially cooperated in the limiting grooves and the releasing position in which the limiting members are disengaged from the limiting grooves.

Optionally, the limiting grooves are disposed inside the cooperating cavity, and the limiting members are disposed on the outer wall of the adapter.

Optionally, the connecting assembly further includes a pressing assembly, an accommodating cavity is provided inside the adapter, the limiting members penetrate a wall of the accommodating cavity in a radial direction of the accommodating cavity, the pressing assembly is disposed in the accommodating cavity and cooperates with the limiting members, and the pressing assembly enables the limiting members to move from the locking position to the releasing position.

Optionally, the pressing assembly includes a pressing member and an elastic member; one end of the elastic member abuts against the pressing member, and other end of the elastic member abuts against the adapter; the pressing member cooperates with the limiting members; on the locking position, the elastic member is in an extended state, the limiting members radially extend out of the accommodating cavity, and an end of the pressing member away from the elastic member partially extends out of the accommodating cavity; and on the releasing position, the elastic member is in a compressed state, and the limiting members are located in the accommodating cavity.

Optionally, the pressing member is provided with first inclined surfaces, and the limiting members are provided with second inclined surfaces cooperating with the first inclined surfaces; and/or ends of the limiting members away from the pressing member are provided with third inclined surfaces.

Optionally, the connecting assembly further includes a limiting screw connected to the adapter and in sliding fit with the pressing member, and the limiting screw enables the pressing member to be retained in the accommodating cavity.

Optionally, the pressing member is provided with first inclined surfaces, and the limiting members are provided with second inclined surfaces cooperating with the first inclined surfaces; and the first inclined surfaces are provided with stopping grooves extending in longitudinal directions of the first inclined surfaces, and the second inclined surfaces are provided with stopping portions in slidable connection with the stopping grooves.

Optionally, both of the stopping grooves and the stopping portions are T-shaped; or the stopping grooves are U-shaped, and the stopping portions are L-shaped.

Optionally, the pressing member is provided with first inclined surfaces, and the limiting members are provided with second inclined surfaces cooperating with the first inclined surfaces; and attracting members are disposed on the first inclined surfaces in the longitudinal directions of the first inclined surfaces, and the attracting members are in attracting connection with the limiting members.

Optionally, the crank quick-connection structure further includes a locking member by which the adapter is connected to the main shaft.

Optionally, the main shaft is provided with a connecting portion, the adapter sleeves the connecting portion, and the locking member is in threaded connection with the connecting portion.

Another object of the present disclosure is to provide a pedal assembly which enables quick assembly and disassembly of a crank and a main shaft, and is simple and convenient to operate, thereby improving user experience and reducing manufacturing costs.

In order to achieve this object, the disclosure present adopts the following technical solution:

a pedal assembly, including the above-mentioned crank and the crank quick-connection structure, and further including a pedal connected to an end of the crank away from the crank quick-connection structure.

Another object of the present disclosure is to provide a bicycle which can save the assembly time and cost for the factor and the user, and is convenient to store and transport, thereby improving the user experience.

In order to achieve this object, the present disclosure adopts the following technical solution:

a bicycle, including a main shaft and two pedal assemblies as mentioned above, wherein the two pedal assemblies are respectively connected to respective ends of the main shaft.

The present disclosure has the beneficial effects. The crank quick-connection structure provided by the disclosure is used for connecting a crank and a main shaft. An adapter is connected to the main shaft, one end of the crank is provided with a cooperating cavity extending in the thickness direction thereof, and the adapter penetrates the cooperating cavity from one end of the cooperating cavity. The connecting assembly is connected to the adapter, and the connecting assembly has a locking position and a releasing position. On the locking position, the crank cooperates with the connecting assembly so that the cooperating cavity and the adapter are locked and connected; and on the releasing position, the crank is disengaged from the connecting assembly so that the crank can be disengaged from the adapter in the axial direction of the adapter. When the crank is to be disassembled, the connecting assembly can be controlled on the releasing position, so that the crank can be disengaged from the adapter in the axial direction of the adapter; when the crank is to be assembled, the adapter can be laterally inserted into the cooperating cavity of the crank to complete the assembly of the crank. When the crank and the adapter are assembled in place, the connecting assembly can be controlled on the locking position to prevent the crank from being disengaged. Therefore, when the crank quick-connection structure in the disclosure is used for assembling or disassembling the crank, it is unnecessary to disassemble related connecting structures, and the crank quick-connection structure enables quick assembly and disassembly of the crank and the main shaft, provides convenience for assembly and has high commonality, thereby improving user experience and reducing manufacturing costs.

LIST OF REFERENCE NUMERALS

Figure 1:
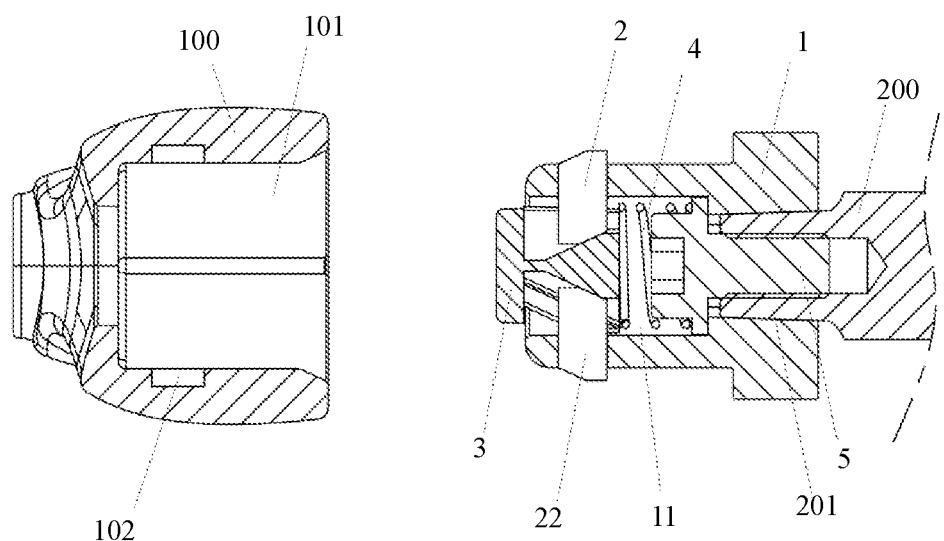
FIG. 1 is a schematic structural diagram of a crank quick-connection structure in an embodiment of the disclosure.

100—crank; 101—cooperating cavity; 102—limiting groove; 200—main shaft; 201—connecting portion; 300—pedal;

1—adapter; 11—accommodating cavity; 2—limiting member; 21—second inclined surface; 22—third inclined surface; 23—stopping portion; 3—pressing member; 31—first inclined surface; 32—sliding chute; 33—stopping groove; 4—elastic member; 5—locking member; 6—limiting screw; and 7—pressing assembly.

DETAILED DESCRIPTION

In order to make the technical problems to be solved, the technical solutions to be adopted and the technical effects to be achieved by the disclosure more clear, the technical solutions of the embodiments of the disclosure will be described in further detail below with reference to the accompanying drawings. Obviously, the described embodiments are only a part of the embodiments of the disclosure, rather than all the embodiments. Based on the embodiments of the disclosure, all other embodiments obtained by a person skilled in the art without creative efforts fall within the protection scope of the disclosure.

In the description of the disclosure, unless explicitly specified and defined otherwise, the terms "connected", "connection" and "fixed" are to be understood in a broad sense, for example, connection may be fixed connection or detachable connection, or integral connection, may be mechanical connection or electrical connection, may be direct connection or indirect connection via an intermediate medium, and may be internal communication of two elements or interaction of the two elements. For a person of ordinary skill in the art, the specific meanings of the above terms in the disclosure may be understood according to specific situations.

In the disclosure, unless explicitly specified and defined otherwise, situations that a first feature is located "above" or "below" a second feature may include that the first and second features are in direct contact, or the first and second features are not in direct contact, but are in contact via another feature between them. Furthermore, situations that a first feature is located "above" or "on the upside of" or "on" a second feature may include that the first feature is located directly above and obliquely above the second feature, or simply means that the horizontal height of the first feature is greater than that of the second feature. Situations that a first feature is located "below" or "on the downside of" or "under" a second feature may include that the first feature is located directly below and obliquely below the second feature, or simply means that the horizontal height of the first feature is smaller than that of the second feature.

The technical solutions of the disclosure will be further described by way of specific embodiments with reference to the accompanying drawings.

As shown in FIG. 1 to FIG. 10, the crank quick-connection structure is used for connecting a crank 100 with a main shaft 200, and includes an adapter 1 and a connecting assembly. The adapter 1 is connected to the main shaft 200, one end of the crank 100 is provided with a cooperating cavity 101 extending in a thickness direction thereof, and the adapter 1 penetrates the cooperating cavity 101 from one end of the cooperating cavity 101. The connecting assembly is connected to the adapter 1, and the connecting assembly has a locking position and a releasing position. On the locking position, the crank 100 cooperates with the connecting assembly so that the cooperating cavity 101 and the adapter 1 are locked and connected; and on the releasing position, the crank 100 is disengaged from the connecting assembly so that the crank 100 can be disengaged from the adapter 1 in an axial direction of the adapter 1. It can be understood that when the crank 100 is to be disassembled, the connecting assembly can be controlled to be in the releasing position so that the crank 100 can be disengaged from the adapter 1 in the axial direction of the adapter 1; when the crank 100 is to be assembled, the adapter 1 can be laterally inserted into the cooperating cavity 101 of the crank 100 to complete the assembly of the crank 100. When the crank 100 and the adapter 1 are assembled in place, the connecting assembly can be controlled in the locking position to prevent the crank 100 from being disengaged. Therefore, when the crank quick-connection structure is used for assembling or disassembling the crank 100, it is unnecessary to disassemble related connecting structures, and the crank quick-connection structure enables quick assembly and disassembly of the crank 100 and the main shaft 200, provides convenience for assembly and has high commonality, thereby improving user experience and reducing manufacturing costs.

In the present embodiment, the main shaft 200 has been known in the prior art, and its detailed structure will not be described herein. However, it can be known that the main shaft 200 should include two parts rotatable relatively to each other, where the adapter 1 is connected to one part of the main shaft 200, and the crank 100 can drive one part of the main shaft 200 to rotate relative to the other part via the adapter 1.

Optionally, as shown in FIG. 1 to FIG. 10, the connecting assembly includes limiting members 2, one of an inner wall of the cooperating cavity 101 and an outer wall of the adapter 1 is provided with the limiting members 2, the other one is provided with limiting grooves 102, the limiting members 2 are movable, in the radial direction of the cooperating cavity 101, between the locking position in which the limiting members 2 are at least partially cooperated in the limiting grooves 102 and the releasing position in which the limiting members 2 are disengaged from the limiting grooves 102. In the present embodiment, the limiting grooves 102 are disposed inside the cooperating cavity 101, the limiting members 2 are disposed on the outer wall of the adapter 1, and the limiting members 2 are limiting pins. It can be understood that, in the locking position, the limiting members 2 are located inside the limiting grooves 102 and can form an interference between the cooperating cavity 101 and the adapter 1, thereby preventing the crank 100 from being disengaged from the adapter 1; when the crank 100 is to be disassembled, the connecting assembly is located in the releasing position, at the moment, the limiting members 2 are disengaged from the limiting grooves 102, that is, the interference between the cooperating cavity 101 and the adapter 1 disappears, so that the crank 100 can be quickly disassembled, the operation is simple and convenient, and the assembling and disassembling efficiencies are increased. Preferably, the limiting grooves 102 are annular grooves extending in a circumferential direction of the cooperating cavity 101, which can ensure that the crank 100 is assembled more simply and conveniently.

In other embodiments, it is also possible that the limiting grooves 102 are not set as the annular grooves, and the limiting members 2 may also be of structures such as bolts which may penetrate the outer wall of the crank 100; after the crank 100 is assembled in place, the bolt may be screwed inwards to the locking position so as to tightly press against the adapter 1; and when the crank 100 is to be disassembled, the bolt may be screwed outwards to the releasing position, the bolt is no longer in contact with the outer peripheral surface of the adapter 1, and thus, the crank 100 may be disengaged from the adapter 1.

Optionally, the connecting assembly further includes a pressing assembly 7, an accommodating cavity 11 is provided inside the adapter 1, the limiting members 2 penetrate a wall of the accommodating cavity 11 in the radial direction of the accommodating cavity 11, the pressing assembly 7 is disposed in the accommodating cavity 11 and cooperates with the limiting members 2, and the pressing assembly 7 enables the limiting members 2 to move from the locking position to the releasing position. Specifically, the side wall of the accommodating cavity 11 is provided with through holes extending radially; the limiting members 2 movably penetrate the through holes, and one end thereof can abut against the pressing assembly 7; when the connecting assembly is in the locking position, the limiting members 2 abut against the pressing assembly 7, at the moment, the limiting members 2 extend out of the through holes to cooperate with the limiting grooves 102; when the crank 100 is to be disassembled, the pressing assembly 7 is pressed towards the interior of the accommodating cavity 11, the pressing assembly 7 moves towards the interior of the accommodating cavity 11, the pressing assembly 7 is disengaged from the limiting members 2, the limiting members 2 fall back into the through holes in the through holes, at the moment, the limiting members 2 are disengaged from the limiting grooves 102, and the interference between the crank 100 and the adapter 1 disappears, so that the crank 100 can be disassembled from the adapter 1, which is simple and convenient to operate. Compared with a method for assembling the crank 100 and the main shaft 200 by using assembling tools and locking screws in the prior art, the crank quick-connection structure does not require the use of tools, so that the costs of processing, transporting and storing the assembling tools in a factory are omitted, and a certain contribution is also made to energy conservation and environmental protection; the user never worry about the loss of the assembling tools and the locking screws, and the use cost is also saved for the user.

Figure 4:
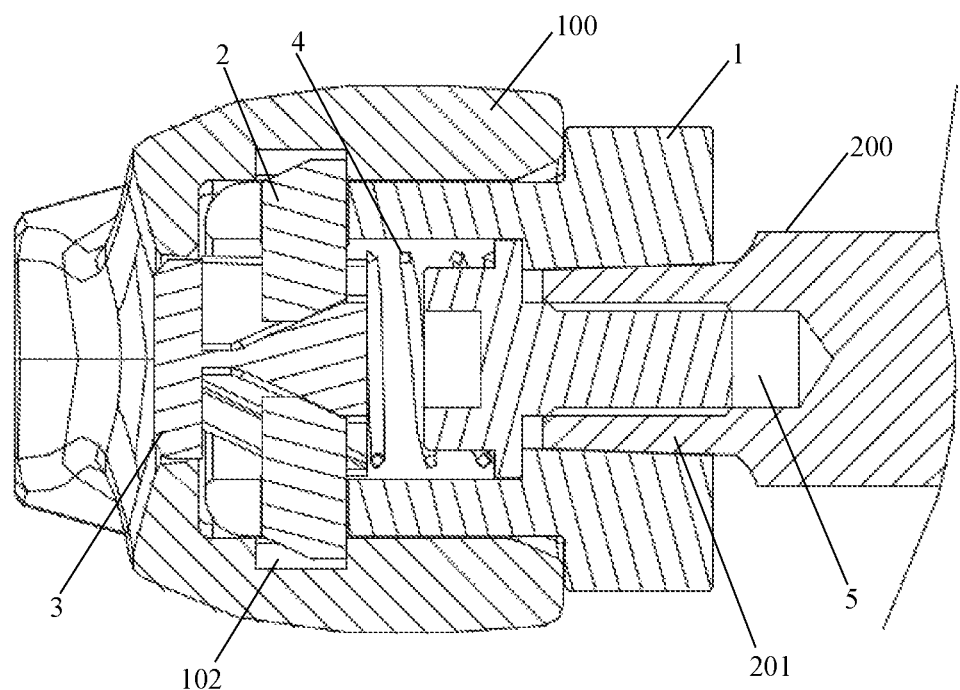
FIG. 4 is a schematic structural diagram showing that a connecting assembly of a crank quick-connection structure is in a locking position in an embodiment of the disclosure.
Figure 5:
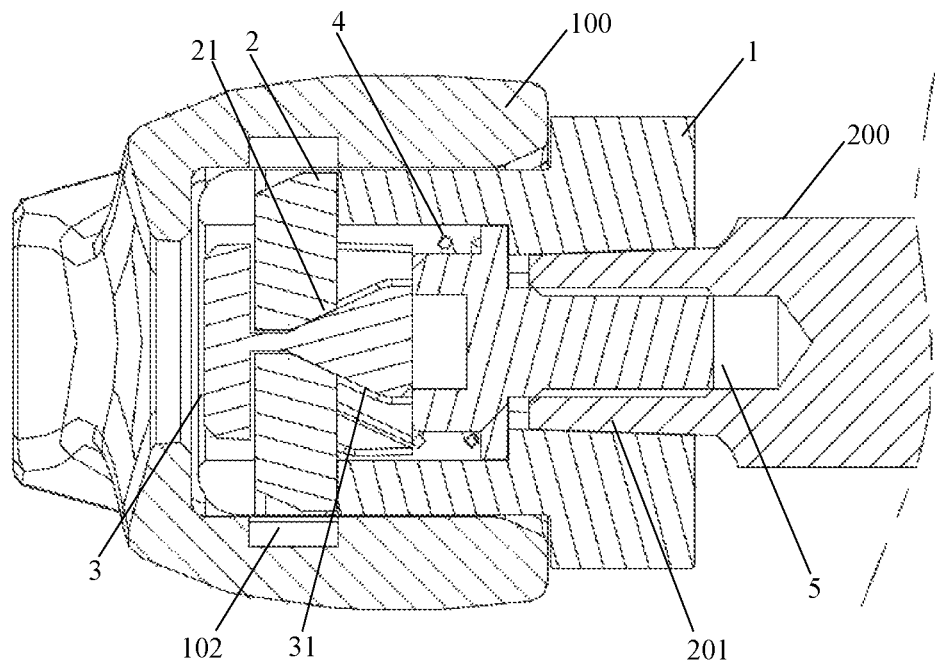
FIG. 5 is a schematic structural diagram showing that a connecting assembly of a crank quick-connection structure is in a releasing position in an embodiment of the disclosure.
Figure 6:
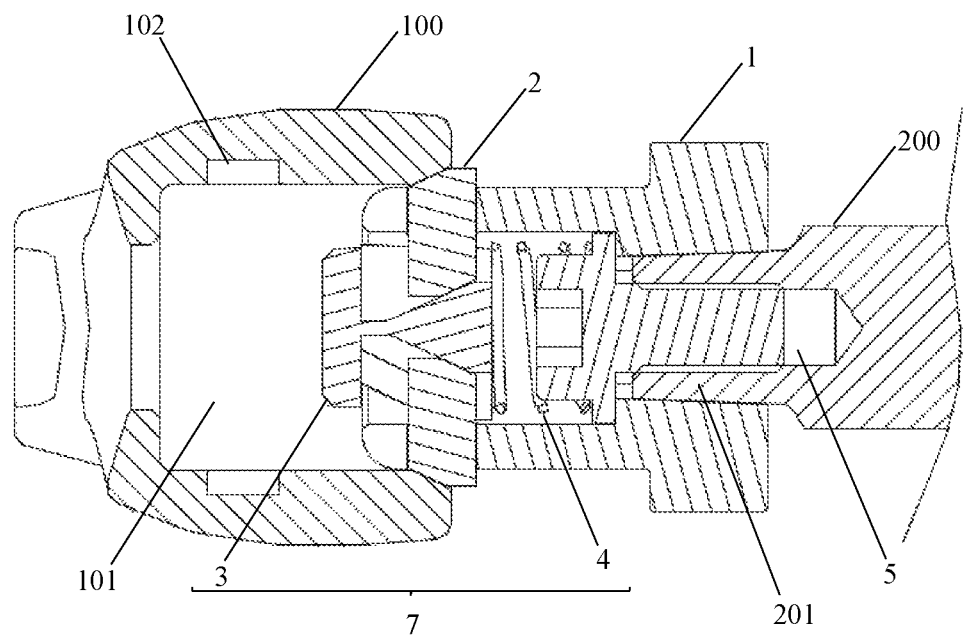
FIG. 6 is a first schematic structural diagram showing that a connecting assembly of a crank quick-connection structure is located between a locking position and a releasing position in an embodiment of the disclosure.
Figure 7:
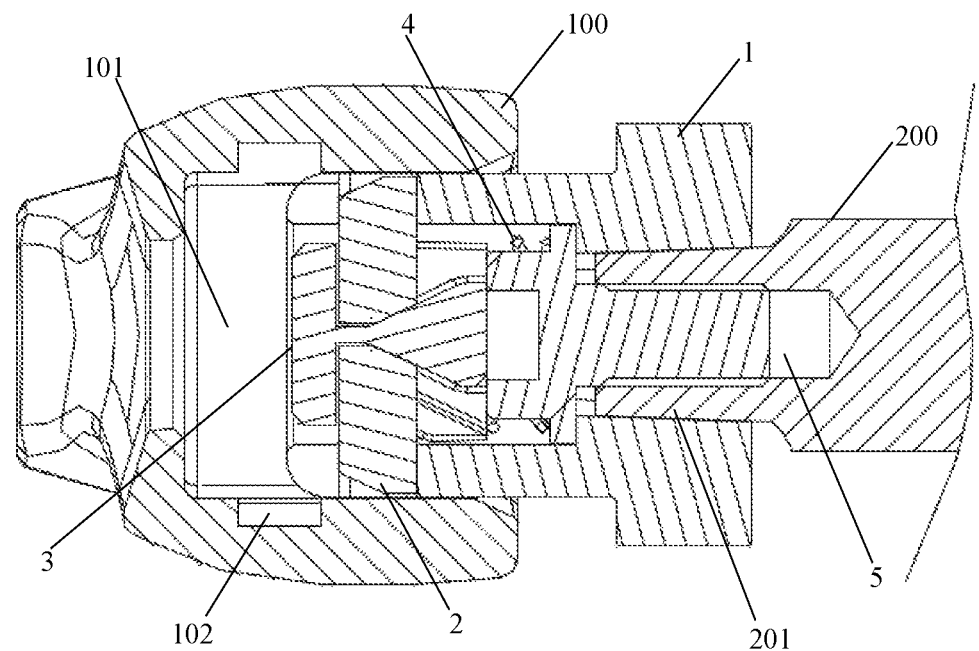
FIG. 7 is a second schematic structural diagram showing that a connecting assembly of a crank quick-connection structure is located between a locking position and a releasing position in an embodiment of the disclosure.

Preferably, the pressing assembly 7 includes a pressing member 3 and an elastic member 4; one end of the elastic member 4 abuts against the pressing member 3, and the other end thereof abuts against the adapter 1; the pressing member 3 cooperates with the limiting members 2, as shown in FIG. 4, in the locking position, the elastic member 4 is in an extended state, the limiting members 2 radially extend out of the accommodating cavity 11, and the end of the pressing member 3 away from the elastic member 4 partially extends out of the accommodating cavity 11; and as shown in FIG. 5, in the releasing position, the elastic member 4 is in a compressed state, and the limiting members 2 are located in the accommodating cavity. It can be understood that, in the locking position, one end of each of the limiting members 2 is in a state of abutting with the pressing member 3, under the action of the pressing member 3, the limiting members 2 extend out of the through holes to cooperate with the limiting grooves 102 of the crank 100, at the moment, the elastic member 4 is in an extended state; and in the releasing position, a supporting force of the pressing member 3 against the limiting members 2 is withdrawn, and the elastic member 4 is compressed, at the moment, the limiting members 2 retract into the through holes, the limiting members 2 are disengaged from the limiting grooves 102, and thus, the crank 100 can be directly disassembled from the adapter 1. In the present embodiment, the cooperating cavity 101 of the crank 100 is in the form of a penetrating structure; when the crank 100 is not assembled, the pressing member 3 does not compress the elastic member 4, and the elastic member 4 naturally extends, at the moment, the pressing member 3 partially extends out of the accommodating cavity 11, at the same time, the pressing member 3 abuts against the limiting members 2 so that the limiting members 2 extend out of the through holes inside the accommodating cavity 11. As shown in FIG. 6 to FIG. 7, when the crank 100 is to be assembled, the cooperating cavity 101 of the crank 100 is aligned with the adapter 1 and is pushed towards the main shaft 200; when the inner wall of the cooperating cavity 101 is in contact with the limiting members 2, there will be a downward pressure on the limiting members 2, at the moment, the limiting members 2 will retract into the through holes in the axial direction of the through holes under the action of the pressure; during this process, the limiting members 2 will press the pressing member 3 to make the pressing member 3 move to the inside of the accommodating cavity 11 (i.e. move towards the main shaft 200), at the same time, the elastic member 4 is pressed to make the elastic member 4 compressed until the crank 100 is pushed to positions where the limiting grooves 102 correspond to the limiting members 2, a pressing force above the limiting members 2 is withdrawn, under the action of an elastic force of the elastic member 4, the pressing member 3 is pushed to move in a direction away from the main shaft 200, at the same time, the limiting members 2 are pushed to extend out of the through holes to be cooperated in the limiting grooves 102, at the moment, the entire connecting assembly is located in the locking position, the crank 100 and the adapter 1 are locked and connected, and thus, a function of assembling the crank 100 and the main shaft 200 is achieved. When the crank 100 is to be disassembled, the pressing member 3 is pressed from a direction where the cooperating cavity 101 of the crank 100 is away from the main shaft 200 to a direction of the main shaft 200, the pressing member 3 moves to the interior of the accommodating cavity 11 so that the supporting force between each of the limiting members 2 and the pressing member 3 disappears, the limiting members 2 fall back into the through holes and are disengaged from the limiting grooves 102, at the moment, the elastic member 4 is in a compressed state, the connecting assembly is located on the releasing position, and the crank 100 can be directly disassembled from the adapter 1, that is, a function of disassembling the crank 100 from the main shaft 200 can be achieved. Compared with a method in which assembling tools and locking screws are used in the prior art, the crank quick-connection structure is capable of achieving one-key operation, simple and convenient to operate, and quick in assembly and disassembly.

In the present embodiment, the pressing member 3 is a button, and the elastic member 4 is a spring. At the same time, in order to facilitate pressing the button, the button can be exposed from one end of the cooperating cavity 101 when the crank 100 is assembled on the adapter 1. In addition, in the present embodiment, the maximum pressure provided by the spring is only 25N, the assembling force is very low, and the crank 100 can be easily assembled and disassembled by female, elderly and child users, and thus, the use range is widened, and the user experience is improved. In other embodiments, the pressing member 3 may be in the form of another structure, and the elastic member 4 may be in the form of a structure such as an elastic washer.

In other embodiments, it is also possible to directly assemble the limiting members 2 in the through holes via a spring; in a normal state, the limiting members 2 extend out of the through holes under the action of the spring; when the crank 100 is to be assembled with the adapter 1, the adapter 1 is directly inserted into the cooperating cavity 101 of the crank 100; as the crank 100 is pushed, under the compression of the inner wall of the cooperating cavity 101, the limiting members 2 move the compressed spring until the limiting members 2 are completely retracted into the through holes, and the crank 100 is further pushed frontwards until the limiting grooves 102 move to the positions of the limiting members 2; at the moment, the interference between each of the limiting members 2 and the inner wall of the cooperating cavity 101 disappears, and under the action of the elasticity of the spring, the limiting members 2 extend out of the through holes until they are cooperated in the limiting grooves 102, at the moment, the connecting assembly is located in the locking position.

Optionally, as shown in FIG. 1 to FIG. 10, the pressing member 3 is provided with first inclined surfaces 31, and the limiting members 2 are provided with second inclined surfaces 21 cooperating with the first inclined surfaces 31. Specifically, the two limiting members 2 are disposed and extend in the radial direction of the accommodating cavity 11, and the two limiting members 2 are symmetrically disposed in the axial direction of the adapter 1; the two first inclined surfaces 31 of the pressing member 3 are also symmetrically disposed in the axial direction of the adapter 1 and respectively cooperate with the two limiting members 2, wherein the upper first inclined surface 31 (in a direction away from the ground) is inclined upwards from the direction of the crank 100 to the direction of the main shaft 200, and the second inclined surfaces 21 are inclined in the same direction as the first inclined surfaces 31 in order to cooperate with the first inclined surfaces 31, that is, the first inclined surfaces 31 and the second inclined surfaces 21 are wedge-shaped cooperation structures; when the pressing member 3 is pressed, the pressing member 3 drives the first inclined surfaces 31 to move towards the main shaft 200; at the moment, the two limiting members 2, under the cooperation of the second inclined surfaces 21 and the first inclined surfaces 31, move towards the central axis of the adapter 1 in the first inclined surfaces 31 until they are retracted to the bottom positions of the first inclined surfaces 31; and when the pressing member 3 is released, under the action of an elastic force of the elastic member 4, the pressing member 3 moves in a direction away from the main shaft 200. At the moment, the first inclined surfaces 31 will push the second inclined surfaces 21 so that the limiting members 2 move in the radial direction of the adapter 1 until they extend out of the through holes. In the present embodiment, in order to ensure the locking effects of the limiting members 2 and the limiting grooves 102, the limiting members 2 have to extend out of the through holes for a certain length, at the same time, the distance from the central axis of the pressing member 3 to the outer wall of the adapter 1 has to ensure that the limiting members 2 can be retracted into the through holes. In other embodiments, the number of the limiting members 2 can be adaptively increased or decreased as long as the reliability of locking in the locking position is guaranteed.

Figure 8:
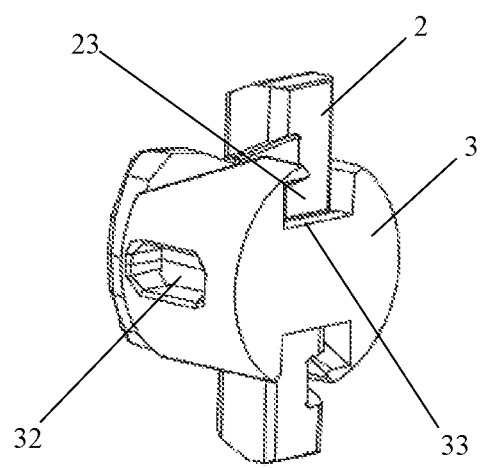
FIG. 8 is a first schematic structural diagram showing the cooperation between a pressing member and limiting members of a crank quick-connection structure in an embodiment of the disclosure.
Figure 9:
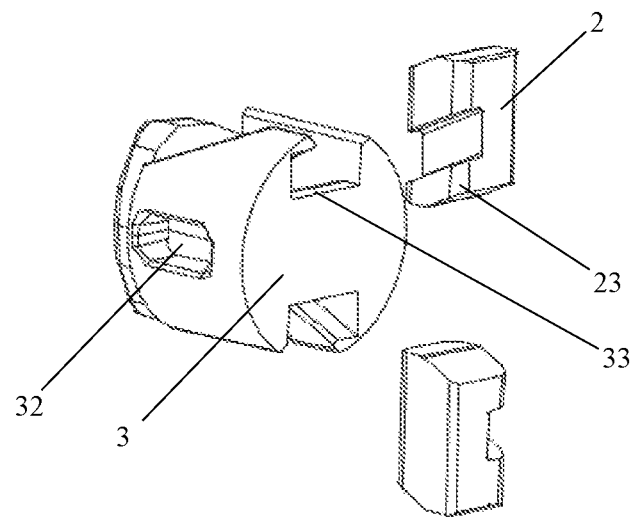
FIG. 9 is a second schematic structural diagram showing the cooperation between a pressing member and limiting members of a crank quick-connection structure in an embodiment of the disclosure.

In order to ensure that the limiting members 2 cannot be disengaged from the through holes, the first inclined surfaces 31 are provided with stopping grooves 33 extending in the longitudinal directions thereof, and the second inclined surfaces 21 are provided with stopping portions 23 in slidable connection with the stopping grooves 33. Specifically, as shown in FIG. 8 to FIG. 9, the stopping grooves 33 are U-shaped, and the stopping portions 23 are L-shaped. In the present embodiment, the L-shaped stopping portions 23 are formed by opening U-shaped groove in the sides of the limiting members 2 in the axial direction; during assembly, the stopping grooves 33 and the U-shaped grooves in the limiting members 2 are snapped together, that is, the stopping portions 23 can be located in the stopping grooves 33; and by means of the sliding connection between the stopping portions 23 and the stopping grooves 33, it can be ensured that the limiting members 2 are always in a state of being connected to the pressing member 3 when sliding in the through holes, so that the limiting members 2 cannot be disengaged from the through holes, which ensures the use effect of the crank quick-connection structure. In addition, due to the cooperation between the stopping portions 23 and the U-shaped stopping grooves 33, when the pressing member 3 is pressed to drive the first inclined surfaces 31 to move towards the main shaft 200, the stopping grooves 33 located on the first inclined surfaces 31 cooperate with the stopping portions 23 to drive the lower limiting member 2 to upwards move (away from the ground) away from the limiting grooves 102 to reach the bottom positions of the first inclined surfaces 31, thereby unlocking the lower limiting member 2; and the design for the shape like a square opened rightwards is beneficial to the machining yield and the assembly of the pressing member 3 and the limiting member 2, and thus, the efficiencies of production and assembly are increased.

Figure 10:
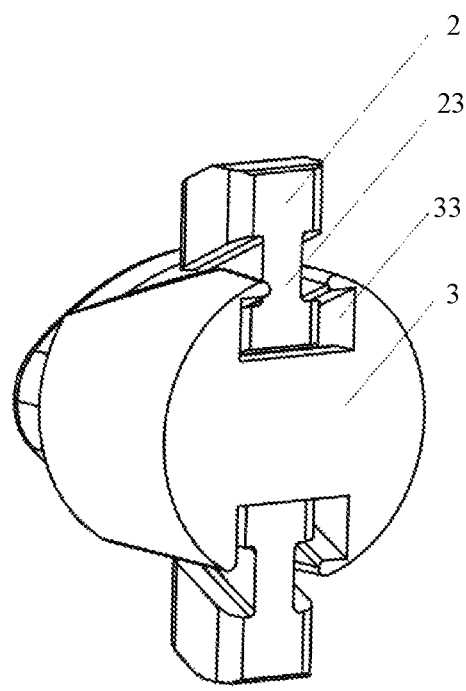
FIG. 10 is a schematic structural diagram showing the cooperation between a pressing member and limiting members of a crank quick-connection structure in another embodiment of the disclosure.

In another embodiment, as shown in FIG. 10, both of the stopping grooves 33 and the stopping portions are T-shaped. It can be understood that, by the sliding connection between the T-shaped stopping portions and the T-shaped stopping grooves 33, it can also be ensured that the limiting members 2 are always kept in a state of being connected to the pressing member 3 when sliding in the through holes, so that the limiting members 2 cannot be disengaged from the through holes; and the lower limiting member 2 can be driven to upwards move (away from the ground) away from the limiting grooves 102 to reach the bottom positions of the first inclined surfaces 31, thereby unlocking the lower limiting member 2.

In another embodiment, it is also possible that the stopping portions 23 and the stopping grooves 33 are not be disposed. Specifically, attracting members are disposed on the first inclined surfaces 31 in the longitudinal directions of the first inclined surfaces 31, and the attracting members are in attracting connection with the limiting members 2. Preferably, the attracting members are neodymium magnets having high-strength magnetism, and the limiting members 2 are made of a material that can be attracted by the magnet. The neodymium magnet strongly and effectively attracts the limiting members 2, and when the pressing member 3 moves back and forth, the neodymium magnet will drive the limiting members 2 to move up and down along the through holes, which not only ensures that the limiting members 2 cannot be disengaged from the pressing member 3, but also reduces the assembling difficulty of the crank quick-connection structure and the production difficulty of the middle stopping portions and the T-shaped grooves. In other embodiments, any other limiting structures known in the prior art may also be adopted.

Preferably, the ends of the limiting members 2 away from the pressing member 3 are provided with third inclined surfaces 22. Specifically, the inner wall of the end of the cooperating cavity 101 of the crank 100, facing the main shaft 200, is provided with chamfers cooperating with the third inclined surfaces 22; when the crank 100 is to be assembled on the adapter 1, the adapter 1 is inserted into the cooperating cavity 101; the third inclined surfaces 22 firstly cooperate with the chamfers and can play a guiding role, thereby facilitating pressing the limiting members 2 into the through holes, and further facilitating the continuous pushing of the crank 100; when a sound "snap" is heard, it indicates that the cooperation between the limiting members 2 and the limiting grooves 102 is completed, at the moment, the assembly of the crank 100 is completed, and therefore, the operation is simple and convenient, the assembling efficiency is greatly increased, the use of assembling tools and the manufacture of locking screws are avoided, and the cost is also reduced.

Figure 2:
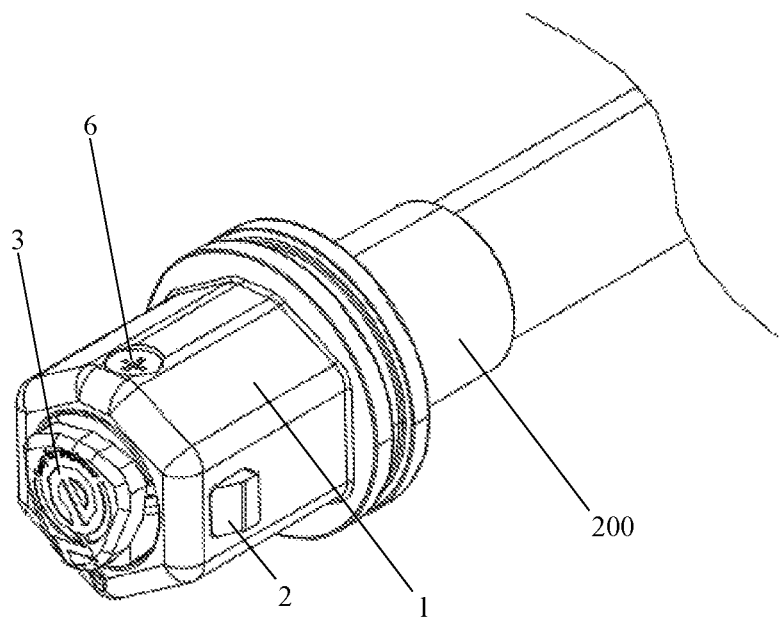
FIG. 2 is a schematic partial structural diagram of a crank quick-connection structure in an embodiment of the disclosure.
Figure 3:
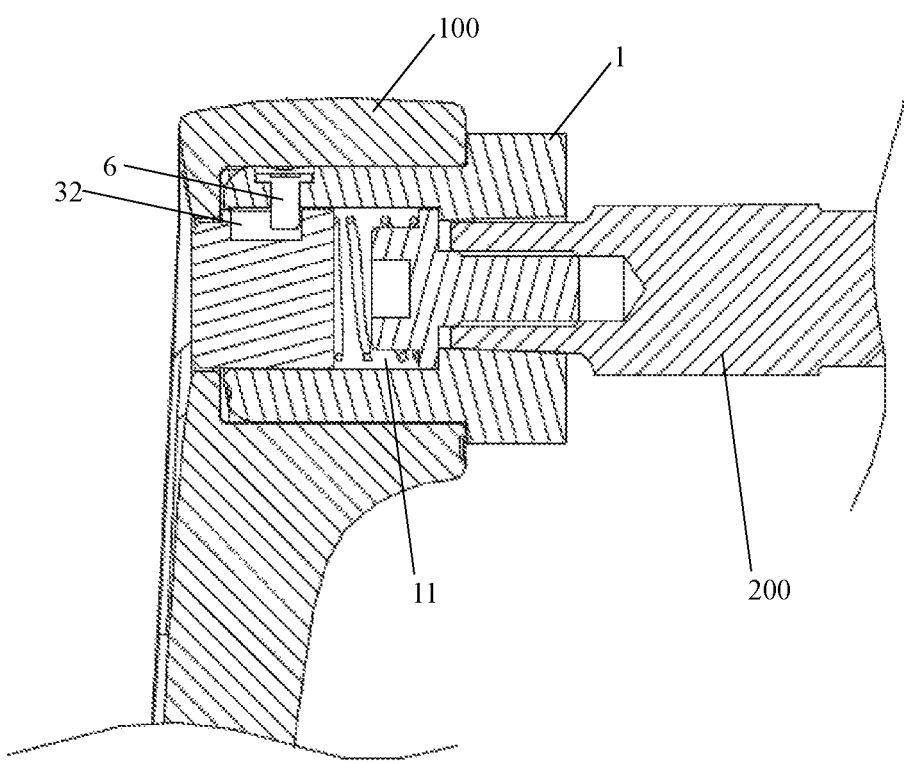
FIG. 3 is a cross-sectional view of the crank quick-connection structure of FIG. 1.

In the present embodiment, in order to avoid the relative rotation of the crank 100 and the adapter 1 after the assembly is completed, the cross sections of the adapter 1 and the cooperating cavity 101 are both set to be polygonal, are specifically set to be quadrangular, pentagonal or hexagonal, etc. so as to ensure that the relative rotation of the crank 100 does not occur after the assembly is completed, and thus, the use effect is ensured. At the same time, in order to prevent the pressing member 3 from being disengaged, as shown in FIG. 2 to FIG. 3, the connecting assembly further includes a limiting screw 6, wherein the limiting screw 6 is connected to the adapter 1 and is in sliding fit with the pressing member 3, and the limiting screw 6 enables the pressing member 3 to be retained in the accommodating cavity 11. Specifically, a sliding chute 32 extending in the length direction is disposed in the pressing member 3, a countersunk hole is disposed in the adapter 1, the limiting screw 6 is disposed in the countersunk hole, and a nut of the limiting screw 6 is disposed in the countersunk hole so as to ensure that the sliding fit between the crank 100 and the adapter 1 is not affected; a rod portion of the limiting screw 6 extends into the accommodating cavity 11 and is located in the sliding chute 32, and the rod portion of the limiting screw 6 is in sliding fit with the sliding chute 32; by disposing the limiting screw 6, it can be ensured that the movement range of the pressing member 3 along the longitudinal direction is the length of the sliding chute 32; as shown in FIG. 3, in the locking position, the limiting screw 6 abuts against the side wall of the sliding chute 32 close to the main shaft 200; and in the releasing position, the limiting screw 6 abuts against the side wall of the sliding chute 32 away from the main shaft 200. Preferably, the length of the sliding chute 32 is matched with the heights of the limiting members 2 rising and falling within the through holes, and the specific values thereof are not limited. In the present embodiment, the rod portion of the limiting screw 6 protrudes towards the interior of the sliding chute 32 for 2 mm; at the same time, in order to ensure a sliding effect, the depth of the sliding chute 32 is greater than 2 mm. In other embodiments, the above-mentioned values can be adjusted adaptively.

Preferably, in order to improve the aesthetics, the cooperating cavity 101 of the crank 100 is set to be stepped, the inner diameter of the end close to the main shaft 200 is larger, the end with the larger inner diameter cooperates with the adapter 1, and the end with the smaller inner diameter is set to have the same shape and size as the pressing member 3, so that the pressing member 3 can be prevented from being exposed on a large area, the aesthetics can be improved, and the risk of false touch can be reduced.

Optionally, the crank quick-connection structure further includes a locking member 5 by which the adapter 1 is connected to the main shaft 200. Specifically, the main shaft 200 is provided with a connecting portion 201, the adapter 1 sleeves the connecting portion 201, and the locking member 5 is in threaded connection with the connecting portion 201. In the present embodiment, the end of the adapter 1 facing the main shaft 200 is provided with a connecting hole, the connecting hole communicates with the accommodating cavity 11, and the diameter of the connecting hole is smaller than the inner diameter of the accommodating cavity 11, that is, a step portion is formed between the connecting hole and the accommodating cavity 11; and the locking member 5 is a bolt, the connecting portion 201 is provided with a threaded hole, a rod portion of the bolt can be in threaded connection with the threaded hole, at the same time, a nut of the bolt can abut against the step portion, and thus, it is ensured that the adapter 1 and the main shaft 200 are locked. At the same time, the nut is set to be stepped, the outer diameter of the end away from the main shaft 200 is smaller than the outer diameter of the end close to the main shaft 200, the elastic member 4 sleeves the end of the nut away from the main shaft 200, one end of the elastic member 4 abuts against a step of the nut, and the above-mentioned arrangement can ensure that the nut of the bolt plays a role in guiding the elastic member 4; in addition, the nut is further provided with an operating hole which facilitates screwing the bolt into the threaded hole of the connecting portion 201. In other embodiments, it is also possible that the nut of the bolt is not set to be stepped, and the elastic member 4 may directly sleeve the nut, and one end thereof directly abuts against the step portion of the adapter 1.

When the crank quick-connection structure in the present embodiment is used for assembling the crank 100, the cooperating cavity 101 of the crank 100 is only required to be aligned with the adapter 1 and to be pushed forwards with force; at the same time, when the crank 100 is disassembled, the crank 100 can be removed from the adapter 1 by only pressing the pressing member 3, which is simple and convenient to operate, one-key disassembly can be achieved without assembling tools, the manufacturing cost is reduced, and the user experience is improved.

Figure 11:
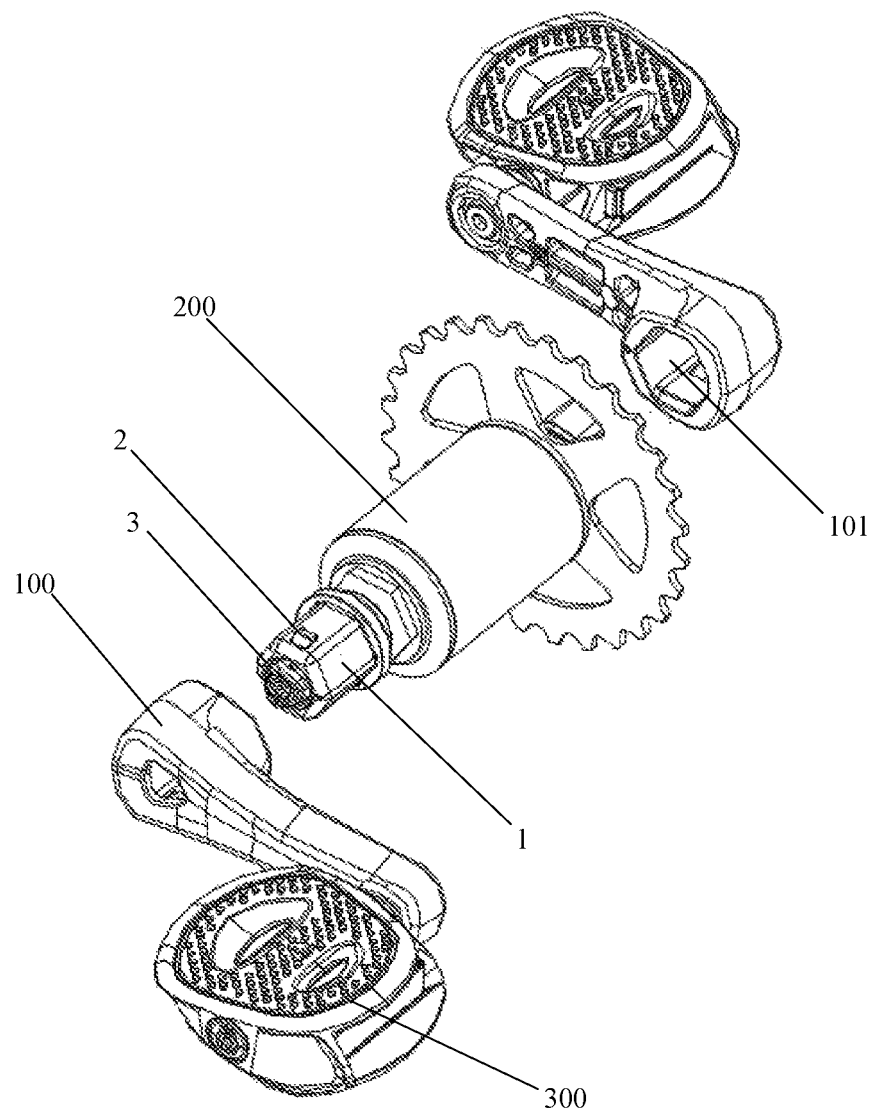
FIG. 11 is a first schematic structural diagram of a pedal assembly in an embodiment of the disclosure.
Figure 12:
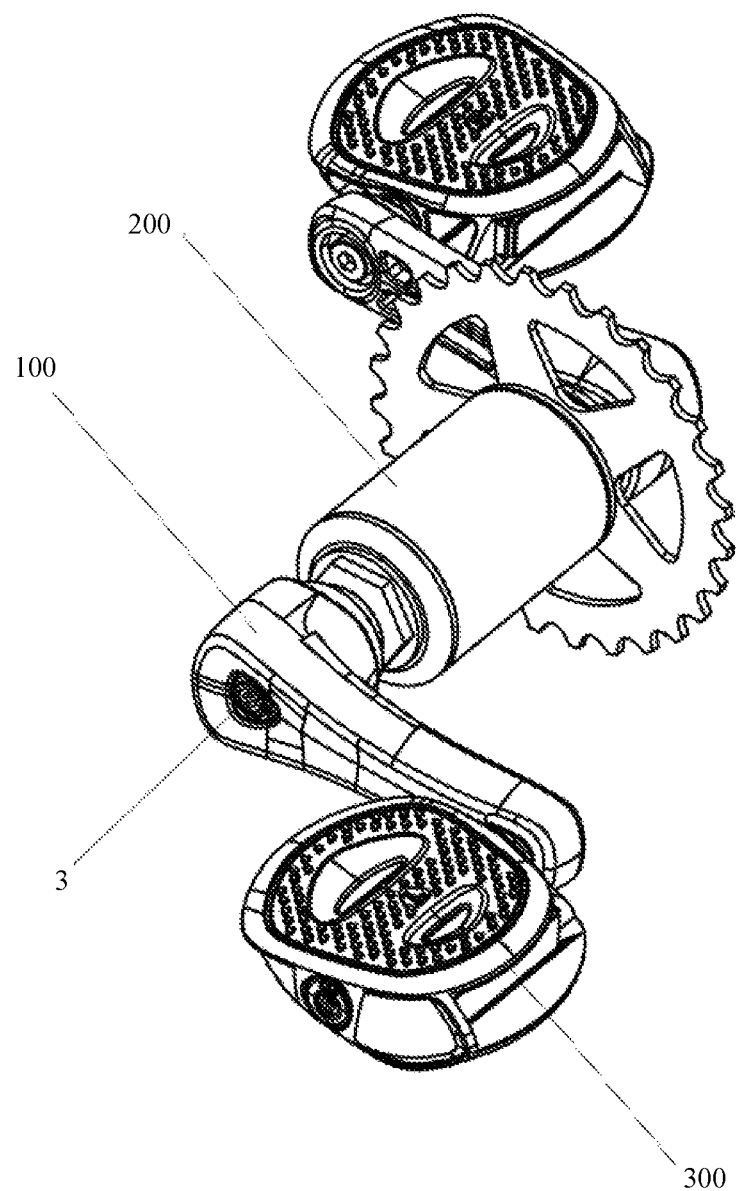
FIG. 12 is a second schematic structural diagram of a pedal assembly in an embodiment of the disclosure.

As shown in FIG. 11 to FIG. 12, the present embodiment further provides a pedal assembly including the crank 100 and the crank quick-connection structure as described above, and further including a pedal 300 connected to the end of the crank 100 away from the crank quick-connection structure. Specifically, a structure which is the same as the above-mentioned crank quick-connection structure may be selected to achieve the quick assembly and disassembly of the crank 100 and the pedal 300, and other connection methods such as bolt connection in the prior art can also be used. In the present embodiment, the pedal 300 has been assembled with the crank 100 before leaving the factory, so that the step of assembly performed by a user can be reduced, and the user experience can be improved.

When the pedal assembly in the present embodiment is assembled, firstly, an adapter 1 is connected to a main shaft 200, and a connecting assembly is connected to the adapter 1; and then, the pedal 300 is connected to the end of the crank 100 away from the adapter 1. It can be understood that, before the pedal assembly leaves the factory, the adapter 1 is connected to the main shaft 200 via a locking member 5; then, the assembly of the connecting assembly and the adapter 1 is completed, so that the connecting assembly is in a locking position; then, the pedal 300 is connected to the other end of the crank 100, and thus, the assembly work before leaving the factory can be completed; that is, before leaving the factory, the crank 100 and the main shaft 200 are separate structures, which is convenient for storage and transportation.

Specifically, the assembly step further includes that the end of the crank 100 away from the pedal 300 is connected to the adapter 1. It can be understood that this step can be performed by the user himself or herself; during assembly, the cooperating cavity 101 of the crank 100 is only required to be aligned with the adapter 1 and then pushed with force, which is simple and convenient to operate without the use of tools, and the operation can be completed by the user himself or herself. In other embodiments, it is also possible that the crank 100 and adapter 1 are assembled completely before leaving the factory.

The present embodiment further provides a bicycle including a main shaft 200 and two pedal assemblies as described above, and the two pedal assemblies are respectively connected to respective ends of the main shaft 200. In the present embodiment, the bicycle is a bicycle for children, and the two pedal assemblies are the same at the left and the right, so that the assembling time and cost are saved for factories and users. At the same time, due to the quick assembly and disassembly of the pedal assemblies and the main shaft 200, the pedal assemblies are not necessarily assembled before the bicycle leaves the factory, so that the width of the bicycle can be reduced, and the storage and transportation of the bicycle are facilitated. In the present embodiment, as the pedal assemblies are not assembled, the width of the bicycle can be reduced by 180 mm. In addition, during use, the bicycle can also be used without assembling the pedal assemblies, that is, the bicycle can be used as a scooter; and after the pedal assemblies are assembled, the bicycle is achieved, so that the effect of a multipurpose bicycle is achieved, and the user experience is improved. In other embodiments, the bicycle may also be of other types such as a bicycle for an adult.

Obviously, the above-mentioned embodiments of the disclosure are only examples for clearly illustrating the disclosure, but are not intended to limit the embodiments of the disclosure. For a person ordinarily skilled in the art, various other changes and variations in different forms can be made on the basis of the above-mentioned description. All the embodiments need not to be, and cannot be, exhaustive. Any modifications, equivalent substitutions, improvements, etc. made within the spirit and principle of the disclosure should fall within the protection scope of the claims of the disclosure.

What is claimed is:

1. A crank quick-connection structure for connecting a crank and a main shaft, comprising:
   an adapter, connected to the main shaft, wherein one end of the crank is provided with a cooperating cavity extending in a thickness direction thereof, and the adapter penetrates the cooperating cavity from one end of the cooperating cavity; and
   a connecting assembly, connected to the adapter, the connecting assembly comprises limiting members which are provided on one of an inner wall of the cooperating cavity and an outer wall of the adapter; the connecting assembly further comprises a pressing assembly, an accommodating cavity is provided inside the adapter, the limiting members penetrate a wall of the accommodating cavity in a radial direction of the accommodating cavity, the pressing assembly is disposed in the accommodating cavity and cooperates with the limiting members; wherein the connecting assembly has a locking position and a releasing position; in the locking position, the crank cooperates with the connecting assembly so that the cooperating cavity and the adapter are locked and connected; and in the releasing position, the pressing assembly enables the limiting members to move from the locking position to the releasing position, the crank is disengaged from the connecting assembly so that the crank is disengaged from the adapter in an axial direction of the adapter.

2. The crank quick-connection structure of claim 1, wherein other one of the inner wall of the cooperating cavity and the outer wall of the adapter is provided with limiting grooves, the limiting members are movable in a radial direction of the cooperating cavity between the locking position in which the limiting members are at least partially cooperated in the limiting grooves and the releasing position in which the limiting members are disengaged from the limiting grooves.

3. The crank quick-connection structure of claim 2, wherein the limiting grooves are disposed inside the cooperating cavity, and the limiting members are disposed on the outer wall of the adapter.

4. The crank quick-connection structure of claim 2, wherein the pressing assembly comprises a pressing member and an elastic member; one end of the elastic member abuts against the pressing member, and other end of the elastic member abuts against the adapter; the pressing member cooperates with the limiting members; on the locking position, the elastic member is in an extended state, the limiting members radially extend out of the accommodating cavity, and an end of the pressing member away from the elastic member partially extends out of the accommodating cavity; and on the releasing position, the elastic member is in a compressed state, and the limiting members are located in the accommodating cavity.

5. The crank quick-connection structure of claim 4, wherein the pressing member is provided with first inclined surfaces, and the limiting members are provided with second inclined surfaces cooperating with the first inclined surfaces; and/or
   ends of the limiting members away from the pressing member are provided with third inclined surfaces.

6. The crank quick-connection structure of claim 5, wherein the pressing member is provided with first inclined surfaces, and the limiting members are provided with second inclined surfaces cooperating with the first inclined surfaces; and
   the first inclined surfaces are provided with stopping grooves extending in longitudinal directions of the first inclined surfaces, and the second inclined surfaces are provided with stopping portions in slidable connection with the stopping grooves.

7. The crank quick-connection structure of claim 6, wherein both of the stopping grooves and the stopping portions are T-shaped; or
   the stopping grooves are U-shaped, and the stopping portions are L-shaped.

8. The crank quick-connection structure of claim 5, wherein the pressing member is provided with first inclined surfaces, and the limiting members are provided with second inclined surfaces cooperating with the first inclined surfaces; and
   attracting members are disposed on the first inclined surfaces in the length directions of the first inclined surfaces, and the attracting members are in attracting connection with the limiting members.

9. The crank quick-connection structure of claim 4, wherein the connecting assembly further comprises a limiting screw connected to the adapter and in sliding fit with the pressing member, and the limiting screw enables the pressing member to be retained in the accommodating cavity.

10. The crank quick-connection structure of claim 1, wherein the crank quick-connection structure further comprises a locking member by which the adapter is connected to the main shaft.

11. The crank quick-connection structure of claim 10, wherein the main shaft is provided with a connecting portion, the adapter sleeves the connecting portion, and the locking member is in threaded connection with the connecting portion.

12. A pedal assembly, comprising the crank quick-connection structure of claim 1, and further comprising a pedal connected to an end of the crank away from the crank quick-connection structure.

13. A bicycle, comprising a main shaft and two pedal assemblies of claim 12, wherein the two pedal assemblies are respectively connected to respective ends of the main shaft.

* * * * *